United States Patent [19]

Daniels et al.

[11] Patent Number: 4,552,997
[45] Date of Patent: Nov. 12, 1985

[54] ARRANGEMENT FOR LOOP ANALYSIS TESTING FOR A DIGITAL SWITCHING SYSTEM

[75] Inventors: William R. Daniels, Chicago, Ill.; John S. Young, Scottsdale, Ariz.

[73] Assignee: GTE Automatic Electric Incorporated, Northlake, Del.

[21] Appl. No.: 566,247

[22] Filed: Dec. 28, 1983

[51] Int. Cl.[4] .............................................. H04B 3/46
[52] U.S. Cl. ................. 179/175.3 R; 370/16; 371/22
[58] Field of Search ............... 179/175.3 R, 175.2 D, 179/175.2 R, 18 J, 18 H; 370/13, 14, 15, 16; 371/15, 16, 18, 20, 22

[56] References Cited

U.S. PATENT DOCUMENTS 4,435,803  3/1984  Das et al. ............................... 370/16
4,454,388  6/1984  Daniels et al. ................. 179/175.2 R Primary Examiner—Stafford D. Schreyer
Attorney, Agent, or Firm—Frank J. Bogacz; Peter Xiarhos

[57] ABSTRACT

The present invention is an interconnection of a loop analysis test system (LATS) to a digital switching system. This arrangement includes the utilization of existing network units to establish a path connection from the computer of a LATS system to a measuring unit of the LATS system. This path through the digital switching system provides for the appropriate signaling requirements in order to simulate a telephone call to the digital switching system for connection to a subscriber. Another path is provided to connect the measuring unit to the subscriber line to be tested via a special access network. In addition, this arrangement includes a data base in the CPU switching system to provide for determining whether the connection of this path through the switching system is for a test access or for normal calling functions. The data base also records the interconnection of equipment such that the proper subscriber's line may be accessed when called by the LATS system.

21 Claims, 4 Drawing Figures

ARRANGEMENT FOR LOOP ANALYSIS TESTING FOR A DIGITAL SWITCHING SYSTEM

CROSS-REFERENCE TO RELATED APPLICATIONS

The present application is related to copending U.S patent application Ser. No. 566,246, assigned to the same assignee and having the same inventive entity as the present invention.

BACKGROUND OF THE INVENTION

The present invention pertains to interconnection of automatic test systems to a telecommunication switching system and more particularly to an arrangement for facilitating loop analysis testing of subscribers of a digital switching system.

Historically, loop analysis testing of subscriber lines connected to step-by-step or electromechanical switching systems was accomplished by external or internal loop analysis test systems (LATS) by obtaining a metallic path through the switching system to the particular subscriber's line. In situations where such loop analysis testing was incidental to a cut-over of a subscriber's line from a step-by-step to an electromechanical switching system, two paths would be established to the subscriber's line appearance in the switching office. The first path would be through the electromechanical switching system and the second path would be through the step-by-step switching system. The LATS system could then utilize both of the systems to have one system ring the subscriber's line and the other to detect that ringing was applied to the proper line.

In this manner, the data base of the electromechanical switching system could be verified for integrity. In addition, once the cut-over of the subscriber's line from the step-by-step to the electromechanical switching system was achieved, the LATS system could then provide in and out testing functions for the subscriber's line appearance on the electromechanical system.

With the advent of digital PCM switching systems in the telecommunications industry, the solid state and time division switching techniques of these systems prohibit the establishment of a metallic path through the switching network for testing of a subscriber's line. These metallic connections form the basis of the seizure of a subscriber's line for loop analysis testing systems. As a result, present LATS systems are unable to perform the required DC tests to verify the portion of the subscriber's line from the switching system out to the subscriber's handset via the outside plant facilities. In addition, the lack of a metallic path prohibited "in testing," that is, testing the path from the appearance of the subscriber's line inward toward the network of a switching system.

A solution to the problem of providing a metallic test path through a digital switching system to facilitate LATS testing, is to incorporate a controller function in a stand alone arrangement. This stand alone controller would be connected between a LATS system and a digital switching system. One such arrangement is shown by an article published in the GTE Network Systems World-Wide Communications Journal, Fourth Quarter, 1983, Vol. 21-4, entitled GTD-5 EAX LATS Access Controller, by George Verbaas. This system provides a sophisticated computer controlled stand alone system for automatically simulating a human craftsperson's interaction with a digital switching system. This controller might be used to interface a toll board or a local test board to a digital switching system.

However, that arrangement does not make efficient use of the computing power of present day digital switching systems and the availability of certain functional equipment already within the digital switching systems. This stand alone equipment is expensive and requires considerable floor space, which is at a premium in modern day digital switching systems.

In addition, the problem of providing a metallic path for testing in such an environment remains unsolved.

Accordingly, it is the object of the present invention to provide a LATS system interface to a digital switching system utilizing the facilities of the digital switching system in an inexpensive and space efficient manner.

SUMMARY OF THE INVENTION

In an arrangement for loop analysis testing for a digital switching system, a loop analysis and test system (LATS) has a computer control unit and at least one measuring unit. Each of the measuring units and the computer control unit is connectable to the digital switching system for transmitting testing information between the units. The arrangement for loop analysis testing includes a first connecting circuit which is connected to the computer control unit of the LATS. The first connecting circuit operates in response to a request of the computer control unit to connect the computer control unit to the digital switching system. A CPU arrangement is connected to the first connecting circuit.

The arrangement for loop analysis testing also includes a digital switching apparatus which is connected to the first connecting circuit and to the CPU arrangement. The digital switching apparatus operates in response to the CPU arrangement to selectively connect the first connecting circuit through the digital switching apparatus to a particular output port of the digital switching apparatus.

The arrangement for loop analysis testing also includes a second connecting circuit which is connected between the output port of the digital switching apparatus and a corresponding measuring unit of the LATS. The second connecting circuit operates in response to the CPU arrangement to connect the corresponding measuring unit to the output port of the digital switching apparatus for transmitting the testing information from the computer control unit to the measuring unit.

Lastly, the arrangement for loop analysis testing includes test access circuitry connected to the corresponding measuring unit and to the CPU arrangement. The test access circuitry is operated in response to the CPU arrangement to establish a path from the corresponding measuring unit to a selected one of the plurality of switching system subscribers for testing the subscriber's outside plant and line facilities.

DESCRIPTION OF THE PREFERRED EMBODIMENT

Figure 1:
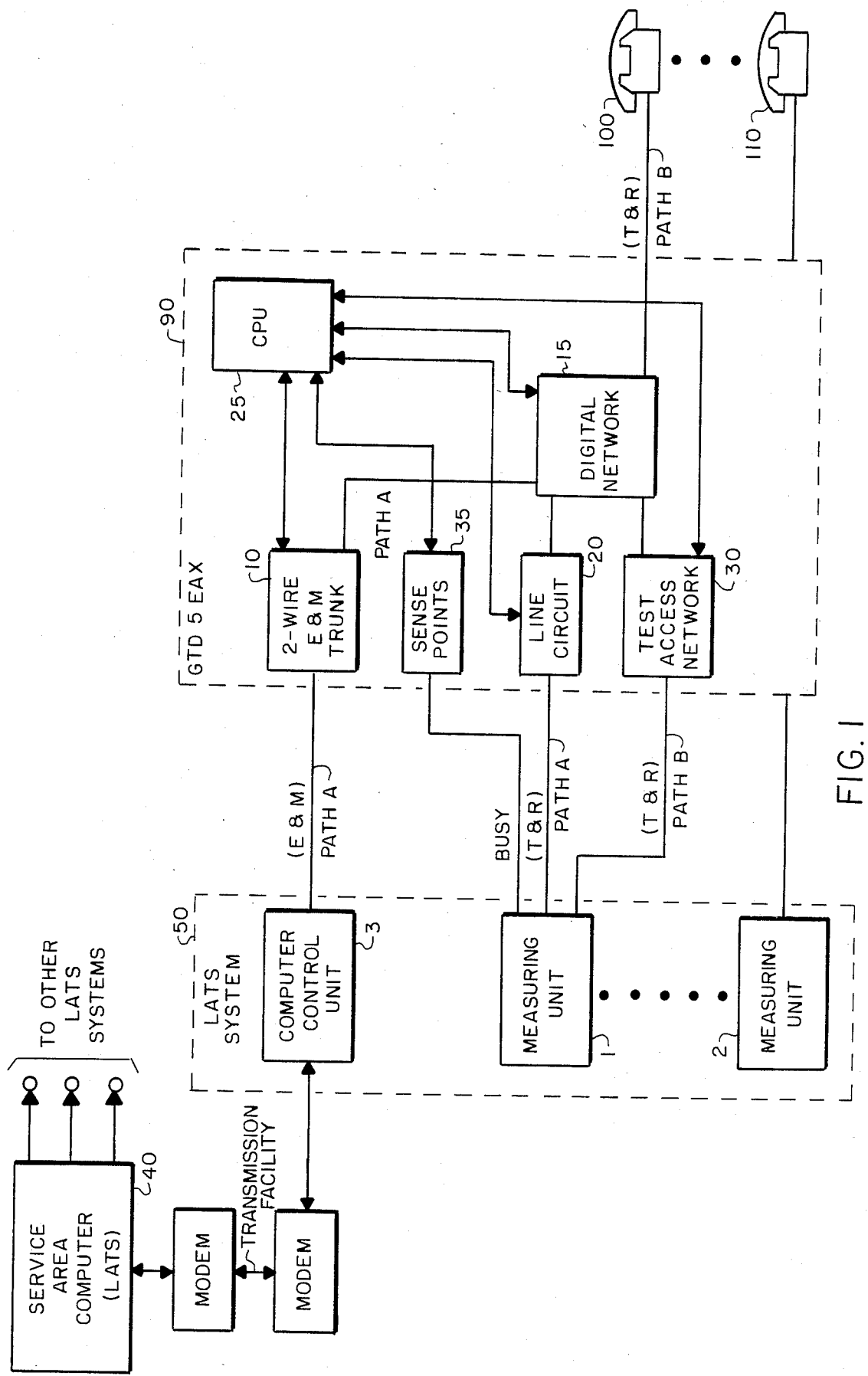
FIG. 1 is a block diagram of an arrangement for loop analysis testing of subscribers' lines embodying the present invention.

Referring to FIG. 1, a block diagram of an arrangement for subscriber external loop analysis and testing of a digital switching system, such as the GTD-5 EAX, is shown. The GTD-5 EAX switching system is a time-space-time digital switching system manufactured by GTE Automatic Electric Incorporated, now doing business as GTE Network Systems. A loop analysis and line test system (LATS) is shown connected to the GTD-5 EAX. The LATS system includes a LATS system local portion which is physically located at the site of the digital switching system and a service area computer (SAC) 40 which may either be located local to the LATS system local portion 50 or remotely and connected to the LATS system local 50 via modems and a transmission facility.

The LATS system local 50 includes a computer control unit (CCU) 3 and a number of measuring units (MU) such as measuring unit 1 and measuring unit 2 shown. The service area computer 40 may be connected to a number of other LATS system local units such as LATS system local unit 50. The LATS system including the service area computer 40 and the LATS system local 50 is a product of the Teradyne 4-TEL Corporation. Although this description contemplates use of the Teradyne 4-TEL LATS system, other manufacturers produce LATS equipment suitable for use in this specified configuration. A representative sample of these manufacturers is: Lordel, Badger and Northern Telcom. The CCU of the LATS system 50 is connected via a tip and ring pair path A, which utilizes E and M signaling, to a two-wire E and M trunk circuit 10 of GTD-5 EAX. The LATS system sees this connection as a data port for communication of the CCU with the GTD-5 EAX via path A.

When the CCU 3 seizes the two-wire E and M trunk 10, the trunk 10, which is connected to CPU 25, will operate in response to CPU 25 to return a wink start signal to the CCU 3 via the E and M leads of that portion of path A. The wink start signal indicates to the CCU 3 that it may initiate testing of a particular subscriber's line which it desires to test. In response to the wink start signal, the CCU 3 will outpulse the appropriate number of digits (e.g. 4, 5, 6, 7 or 10) to permit the GTD-5 EAX 90 to determine the identity of the particular line to be tested. The CPU 25 of the GTD-5 EAX 90 will contain in its data base the identity of which MU contains the appearance of the particular subscriber's line to be tested. That is, does the subscriber's line, such as subscriber 100 or subscriber 110, appears on MU 1 or MU 2, etc.? Each MU is capable of providing its measuring tests for up to 6,144 lines, while the GTD-5 EAX system may contain tens of thousands of subscribers.

Next, CPU 25 will switch the output of the two-wire E and M trunk 10 through the digital time-space-time switching network 15, based upon the indications contained in the CPU's 25 data base as to the particular line to be tested. That is, path A will be further extended from the two-wire E and M trunk 10 through switching network 15 to a particular line circuit 20 which services a particular MU such as MU 1. Thus, path A has been extended from the CCU 3 through the two-wire E and M trunk 10 through network 15 through line circuit 20 to MU 1. The connection of line circuit 20 to MU 1 provides a path for transmission of operating instructions from CCU 3 to MU 1.

Line circuit 20 is a ground start line circuit. Once the cut through of path A is established from CCU 3 to MU 1, CPU 25 will send an off-hook signal to CCU 3 via E and M trunk 10 to indicate that this cut through has been established. If such cut through was unable to be established, one of a series of DTMF digits will be sent through the E and M trunk 10 under control of CPU 25 to the CCU 3. This DTMF digit will indicate the type of condition encountered by the GTD-5 EAX, which prevented the proper cut through (see Table A).

TABLE A

| Line Status | Cut Through | DTMF Digit | Signal on CCU |
|---|---|---|---|
| Idle Line | X | — | Off Hook |
| Line Busy on Normal Call or Reverting Call | | 1 | On Hook |
| Blockage (e.g., Network, Host Remote Link Concentrator) | | 4 | On Hook |
| Line in Lockout | X | | Off Hook |
| Line out of Service | | | |
| CMU Data Lines (Group) Busy | | 4 | On Hook |
| Test Access Busy | | 2 | On Hook |
| Intercept | | 3 | On Hook |
| Error | | 3 | |
| Precut | X | | |

After the directory number of the line to be tested is outpulsed by CCU 3 via the E and M trunk 10, CPU 25 will terminate path A through network 15 to ground start line circuit 20. This ground start line circuit 20 is specifically dedicated to a particular MU such as MU 1. Each MU which is connected to the particular GTD-5 EAX will have a dedicated ground start line circuit to which the MU may be connected.

CPU 25 contains a special data base which indicates each particular group of 6,144 lines which are served by a particular MU. When the CPU 25 terminates path A to the ground start line circuit 20, the tip side of the line will be grounded. This ground on the tip side of the line indicates that the MU has been seized and path A has been completed. In addition, the call processing software of the GTD-5 EAX through its data base, will inhibit ringing to these lines as outlined above, if the MU is busy or blockage is encountered, the DTMF digit will be returned to the CCU 3 as defined in Table A.

It should be noted that a group of external sense points 35 is connected to each MU. There is one sense point in the group 35 for each MU, which indicates to the CPU 25 that the associated MU is currently busy. The connection of the MU to the sense point group 35 is established via a BUSY lead corresponding to each MU. Table B summarizes the various actions taken by the GTD-5 EAX when the CCU 3 dials a particular line to be tested.

TABLE B

| CUT THROUGH vs. INTERCEPT | |
|---|---|
| CCU DIALS | ACTION |
| DN of line with two DNs (e.g. multi-party) | Cut Through for both DNs |
| Unassigned directory | Intercept |

TABLE B-continued

CUT THROUGH vs. INTERCEPT

| CCU DIALS | ACTION |
|---|---|
| number | |
| Access code followed by existing MLH group and member number | Cut Through |
| Access code followed by non-existing MLH group and member number | Intercept |
| DN pointing to route index, route index pointing to a line | Cut Through |
| DN of line with call diversion, except remote call forwarding action | Cut Through to the directory number |
| DN of line with remote call forwarding action | Intercept |
| DN pointing to something which is not a line | Intercept |
| DN of a pilot number | Intercept |
| GTD-5 EAX aborts the call | Re-order tone |

Next, a path B is established from MU 1 via a tip and ring pair to the test access network 30 of the GTD-5 EAX 90. Then path B is further extended through test access network 30 to the particular subscriber 100, via his tip and ring pair. As a result, path B is completed from MU 1 through the test access network 30 to subscriber 100. Once path B has been established, CPU 25 will send an off-hook indication to CCU 3 via E and M trunk 10. When CCU 3 detects the off-hook indication, CCU 3 will then transmit instructions to MU 1 via path A to begin the out testing of subscriber 100's line. In response, MU 1 will carry out its measurements via path B.

When MU 1 has completed its testing, MU 1 will notify CCU 3 of the results via path A. CCU 3 will then send an on-hook indication to the GTD-5 EAX 90 via E and M trunk 10. When CPU 25 detects this on-hook indication, it will operate E and M trunk 10, line circuit 20 and test access network 30 to release both path A and path B and bring to an idle state each of the equipment associated with these paths. LATS system 50 may then select another line to be tested and repeat the above outlined procedure for each such line to be tested.

Figure 2:
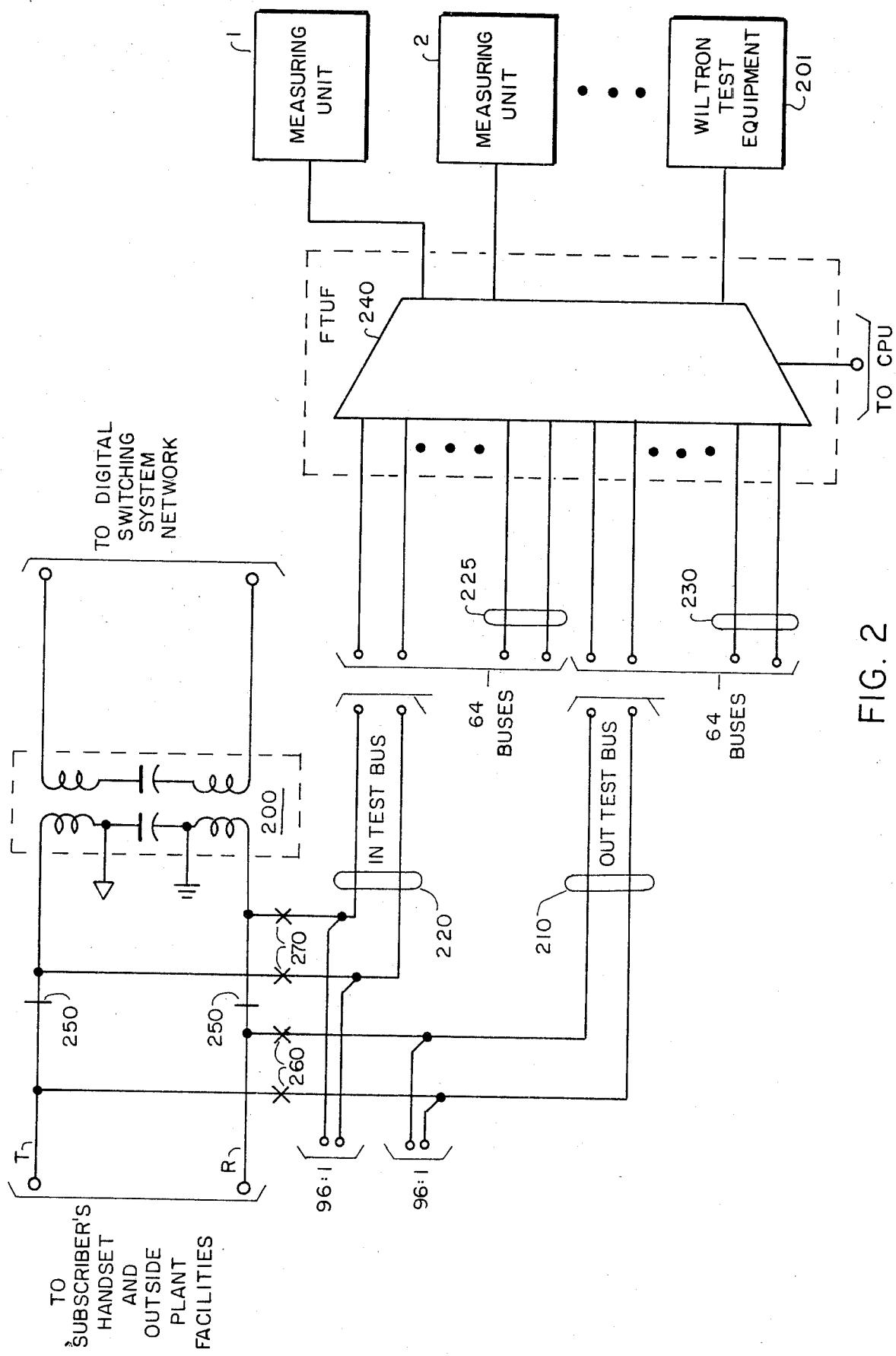
FIG. 2 is a schematic diagram of the test access arrangement embodying the principles of operation of the present invention.

FIG. 2 depicts the path B connection of FIG. 1 from a subscriber's line under test to a measuring unit MU 1 or other testing device, such as Wiltron test equipment 201. The tip lead T and ring lead R of the subscriber's line are shown connected between the subscriber and the digital switching system. Battery feed device 200 which is located at the site of the digital switching system is connected to the tip T and ring R leads of the subscriber's line. Associated with each subscriber, is a test access relay (not shown). The contacts of the test access relay for a particular subscriber's line are shown in FIG. 2 as break contacts 250 and make contacts 260 and 270.

When the test access relay is operated, break contacts 250 operate to disconnect the T and R leads of the subscriber's line from the switching system. Simultaneously, make contacts 260 operate to connect the T lead and the R lead of the subscriber's line to the out test bus 210 and make contacts 270 operate to connect the T and R leads which proceed to the battery feed device 200 to the in test bus 220. As a result, two loops now exist. First, one loop is established from the out test bus 210 to the T and R leads of the subscriber's line under test outward toward the subscriber's handset. Second, a loop exists between in test bus 220 via make contacts 270 to the T and R leads of the subscriber's line inward toward the battery feed device 200 of the subscriber's line in the switching system. Via the out test bus 210, out tests may be performed on the subscriber's line. These out tests include but are not limited to: (1) resistance check of the outside plant facility connection to the switching system which is normally in the range of 200 to 2.2K ohms; (2) a battery foreign potential check to determine whether, for example, 110 volts AC is inadvertently placed upon the subscriber's line; (3) a capacitance test; (4) leak resistance test to determine whether insulation break down exists; and (5) Varley test.

In addition, "in testing" (testing toward the digital switching system network) may be performed via the in test bus 220 through make contacts 270 to the T and R leads, to battery feed device 200 in toward the switching system. The in test includes, although it is not limited to, a call through test. A call through test includes the steps of: (1) seizing the line toward the switching system via the in test bus 220; (2) detecting the application of battery feed to the T and R leads from the battery feed device 200; (3) receiving the applied dial tone of the switching system; and (4) going "on-hook" and causing the connection to the in test bus 220 to be dropped.

The out test bus 210 is connected from the outward side of the subscriber's line via the T and R leads via make contacts 260 to concentration network 240. Concentration network 240 is contained in a facility test unit frame (FTUF). The out test bus 210 is multiple connected to 96 subscriber lines. That is, the out test bus 210 may connect any one of 96 subscribers to concentration network 240. In addition, up to 64 out buses may be connected to concentration network 240. As a result, concentration network 240 may provide for connecting test equipment to 96×64 subscribers' lines or a total of 6,144 subscriber lines. The selection of which subscriber is connected via the 96 line multiple connection to out test bus 210 for example, is controlled by the CPU operation of a particular access relay (not shown) which operates contacts 250, 260 and 270 corresponding to each particular subscriber's line.

Similarly, in test bus 220 is connected to the T and R leads of the subscriber's line inward toward battery feed device 200 and the switching system. Break contacts 250 separate the connections of the in test bus 220 and the out test bus 210 to the subscriber's line. In test bus 220 is connected through concentration network 240 to a testing device such as a measuring unit MU 1, MU 2 or other test equipment such as a Wiltron test equipment device 201. Each in test bus is multiple connected to 96 subscribers' lines.

The selection of which particular subscriber's line is connected to the in test bus 220 is controlled by the CPU by operation of the particular subscriber's test access relay (not shown). In addition, corresponding to the out test buses, there may be a total of 64 in buses as represented by in test buses 220–225. Each of these buses are connected to concentration network 240. Further connection of in test bus 220 is made through concentration network 240 to test equipment such as a measuring unit MU 1 or Wiltron test equipment 201.

As a result, 64 buses each providing 96 subscriber connections, give a capacity of 6,144 subscriber connections via in test buses to concentration network 240 of the FTUF. These 6,144 subscribers are the same 6,144 subscribers which would be connected to concentration network 240 via the out buses. That is, when a particular subscriber's test access relay is operated two bus connections are established to concentration network 240. Two connections are established: an in bus connection via in test bus 220 and an out test bus connection via out bus test 210. For large switching system capacities, such as the GTD-5 EAX, which provide for many thousands of subscriber terminations, one FTUF could be included to provide testing access for three groups of 6,144 subscribers.

As a result, measuring unit 1 is connected through concentration network 240 via the out test bus 210 through make contacts 260 to the T and R leads of the subscriber's line outward toward the subscriber's handset. The LATS system 50 of FIG. 1 may now, via computer control unit 3, instruct the measuring unit 1 to perform the out tests outlined above via this path. In addition, the measuring unit or Wiltron test equipment may be connected via concentration network 240 via in test bus 210 through make contacts 270 to the T and R leads inward toward battery device 200 of the switching system. This connection accommodates in testing as was outlined previously.

Figure 3:
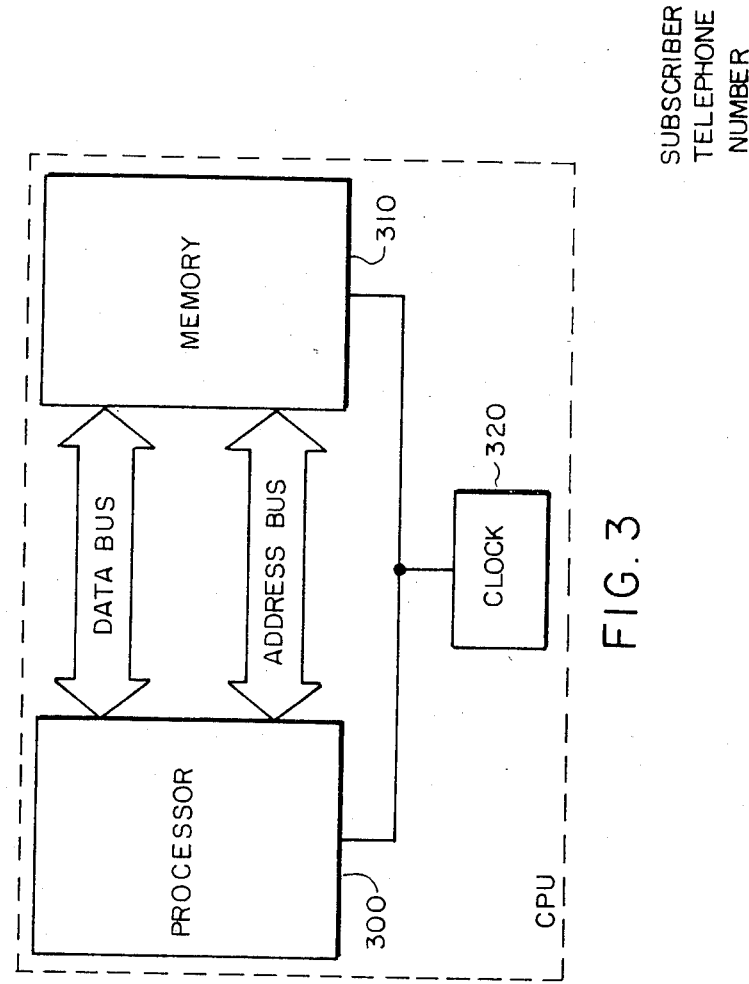
FIG. 3 is a block diagram of the CPU arrangement of the digital switching system of the present invention.

Referring to FIG. 3, the details of CPU 25 of FIG. 1 are shown. The processor 300 is shown connected to clock 320. Processor 300 may be implemented using an Intel 8086 microprocessor CPU. Intel is a registered trademark of the Intel Corporation. Clock 320 provides processor 300 with the basic timing signals required for the processor's internal operation. Clock 320 also provides these timing signals via a connection to memory 310.

Memory 310 and processor 300 are interconnected via an address bus and a data bus. The memory provides for storing the operating program which processor 300 executes. In addition, memory 310 contains a data base, which is specifically engineered for each particular GTD-5 EAX switching system.

The data base contains a number of parameters which serve to describe the characteristics of each subscriber's line. One of the characteristics associated with each subscriber is his particular telephone number. Another characteristic of the subscriber's line is the network inlet identity. Data base stored in memory 310 can relate these two characteristics to each other. Such data base is a translation table from network inlet identity to a subscriber's telephone number.

Figure 4:
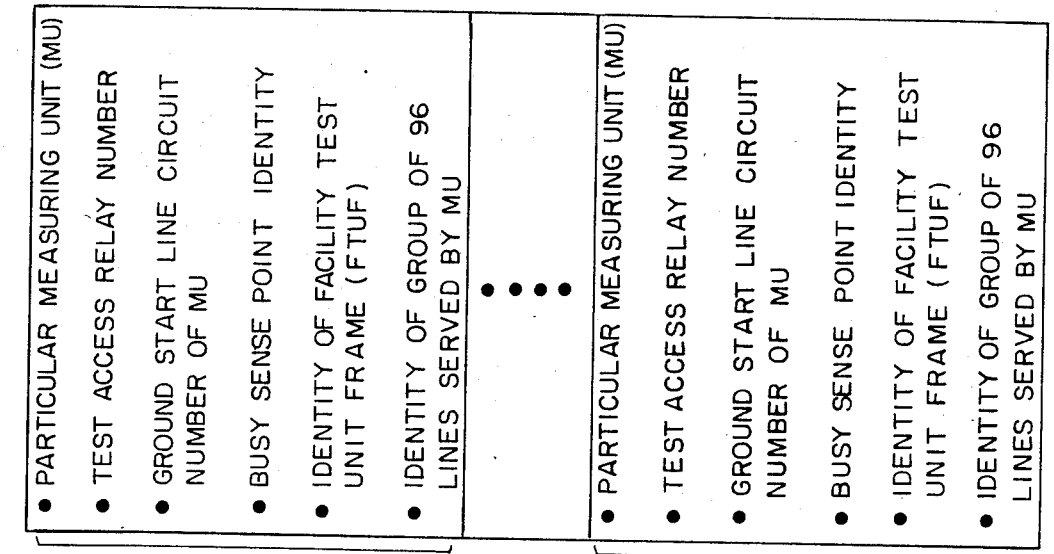
FIG. 4 is a memory layout of the data base for loop analysis testing arrangement of the present invention.

Referring to FIG. 4, the data base pertaining to the test access network is shown. The test access network data base is required to connect a particular subscriber's line through the concentration network (240 of FIG. 2) of the facility's test unit to external testing devices. This data base may be indexed with the subscriber's telephone number. Each subscriber's entry in this data base contains a number of characteristics relating to an access of the subscriber's line for testing. The test access network data base includes the identity of the particular measuring unit which serves the subscriber's line; the identity of the test access relay which is required to be operated to split the subscriber's line for in and out testing; the identity of the ground start line circuit which is used to connect the measuring unit through the network for access by the computer control unit of the LATS system; the identity of the busy sense point associated with the measuring unit of the subscriber's line; the identity of the facility test unit frame associated with the subscriber's line; and the identity of the group of particular 96 lines which is served by a particular measuring unit.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In an arrangement for loop analysis testing for a digital switching system, a loop analysis and test system (LATS) having a computer control unit and at least one measuring unit, each being connectable to said digital switching system for testing connections of said digital switching system to a plurality of subscriber's lines, said arrangement for loop analysis testing comprising:

CPU means;

a plurality of sense point means connected to said CPU means;

a plurality of connections, a connection from each of said plurality of sense point means to a corresponding measuring unit;

each said sense point means being operated to contain a first logic value for a busy condition of said corresponding measuring unit or alternatively each said sense point means being operated to contain a second logic value for an idle condition of said corresponding measuring unit; and said CPU being operated to interrogate each said sense point means for determining said busy and said idle condition of each said corresponding measuring unit;

first means for connecting being connectable to said computer control unit of said LATS and being connected to said CPU means, said first means for connecting being operated in response to a request from said computer control unit and said CPU means to connect said computer control unit to said digital switching system;

digital switching means connected to said first means for connecting and to said CPU means, said digital switching means being operated in response to said CPU means to selectively connect said first means for connecting through said digital switching means to a particular output port of said digital switching means;

second means for connecting being connectable between said output port of said digital switching means and a corresponding measuring unit of said LATS, said second means for connecting being operated in response to said CPU means to connect said corresponding measuring unit to said output port for transmitting messages between said computer control unit and said measuring unit;

test access means connected to said corresponding measuring unit and to said CPU means, said test access means being operated in response to said CPU means to provide a path from said corresponding measuring unit to a selected one of said plurality of subscribers for testing said subscriber's outside plant and line facilities.

2. An arrangement for loop analysis testing as claimed in claim 1, wherein there is further included monitoring means connected to said loop analysis and test system (LATS) for collecting results of said testing information of said computer control unit and said plurality of measuring units.

3. An arrangement for loop analysis testing as claimed in claim 2, said connection of said monitoring means to said LATS including:
said monitoring means including a service area computer means;
a first modem connected to said service area computer means;
a transmission line facility connected to said first modem; and
a second modem connected between said transmission line facility and said computer control unit.

4. An arrangement for loop analysis testing as claimed in claim 3, said service area computer means including a plurality of connections to a plurality of LATS.

5. An arrangement for loop analysis testing as claimed in claim 1, said CPU means including:
processor means having an address bus and a data bus and being operated to control said digital switching system;
memory means connected to said processor means via said address bus and said data bus and being operated to store data; and
clock means connected to said processor means and to said memory means, said clock means being operated to control said operation of said processor means and said memory means.

6. An arrangement for loop analysis testing as claimed in claim 5, said processor means including a microprocessor CPU.

7. An arrangement for loop analysis testing as claimed in claim 5, said memory means including a plurality of means for storing a plurality of subscriber information for a plurality of subscribers of said digital switching system.

8. An arrangement for loop analysis testing as claimed in claim 7, each of said means for storing including:
first means for indicating the identity of a particular measuring unit serving a subscriber;
second means for indicating the identity of a test access relay associated with a subscriber;
third means for indicating the identity of a ground start line circuit of a measuring unit associated with a subscriber;
fourth means for indicating the identity of said busy sense point associated with the measuring unit of a subscriber;
fifth means for indicating the identity of a facility test unit associated with a subscriber; and
sixth means for indicating the identity of a group of predetermined number of subscribers served by a measuring unit.

9. An arrangement for loop analysis testing as claimed in claim 8, wherein each of said means for indicating is stored for each of said plurality of subscribers of said digital switching system.

10. An arrangement for loop analysis testing as claimed in claim 1, said first means for connecting including trunk circuit means.

11. An arrangement for loop analysis testing as claimed in claim 10, said trunk circuit means including a two wire E and M trunk circuit.

12. An arrangement for loop analysis testing as claimed in claim 1, said digital switching means including digital switching network means.

13. An arrangement for loop analysis testing as claimed in claim 12, said digital switching network including a time-space-time digital switching network.

14. An arrangement for loop analysis testing as claimed in claim 1, said second means for connecting including line circuit means.

15. An arrangement for loop analysis testing as claimed in claim 14, said line circuit means including a ground start line circuit.

16. An arrangement for loop analysis testing as claimed in claim 1, said test access means including concentration means.

17. An arrangement for loop analysis testing as claimed in claim 16, said test access means including a test access relay including:
break contacts connected to said subscriber's line and operated to electrically disconnect said subscriber's line from said digital switching means and forming an "out-portion" of said line extending toward said subscriber and forming an "in-portion" extending toward said digital switching means;
first make contacts connected to said "outportion" of said line and said first make contacts simultaneously operated with said break contacts to connect said "out-portion" of said line to said concentration means; and
second make contacts connected to said "inportion" of said line and said second make contacts simultaneously operated with said break contacts and said first make contacts to connect said "in-portion" of said line to said concentration means.

18. An arrangement for loop analysis testing as claimed in claim 17, wherein:
said connection of said "out-portion" of said subscriber's line to said concentration means constitutes an out-test bus including multiple connections to a predetermined plurality of said subscribers; and
said connection of said "in-portion" of said subscriber's line to said concentration means constitutes an in-test bus including multiple connections to a predetermined plurality of said subscribers.

19. An arrangement for loop analysis testing as claimed in claim 18, said concentration means further including:
connection to a predetermined plurality of in-test buses; and
connection to a predetermined plurality of out-test buses.

20. An arrangement for loop analysis testing as claimed in claim 19, wherein: said concentration means is connected to a plurality of said measuring units and to said CPU means and said concentration means operated in response to said CPU means to selectively connect said "in-portion" and said "out-portion" of a particular subscriber's line via a metallic path through said concentration means to a particular measuring unit.

21. An arrangement for loop analysis testing as claimed in claim 20, wherein there is further included a plurality of said concentration means, each connected to said CPU means.

* * * * *